Patented Apr. 21, 1936

2,037,913

UNITED STATES PATENT OFFICE 2,037,913

SEALING COMPOSITION

Frederic A. Madenwald and Norman J. Beno, Chicago, Ill., assignors to Continental Can Company, Inc., New York, N. Y., a corporation of New York No Drawing. Application October 3, 1930, Serial No. 486,282

2 Claims. (Cl. 106—8)

The invention relates to a new and useful improvement in a sealing material, preferably for use in connection with the hermetically joining of metal ends to a metal can body. It has been a common expedient to provide the channel of an end which is to be seamed to a can body with a thin film of sealing material which hermetically seals the joints when the metal parts are rolled into a double seam.

An object of the present invention is to provide a sealing material for the above purposes, which may be made from a non-fluid organic material of the nature of natural or synthetic resins or gums as a base, which is applied to the ends as a solution in a suitable peptizing medium, and in which solution may be combined suitable modifying ingredients so that upon evaporation of the liquid medium a film may be obtained which has the desired characteristics for effecting an efficient seal.

By the selection of the resin or gum, with modifying ingredients including plasticizers and fillers, and the peptizing medium, the characteristics of the sealing material as a composition, and of the seal formed therefrom, may be varied as desired to satisfy the conditions arising from the material of the container and the material to be packed into the container.

In carrying out the invention, a resinous material is selected which is insoluble in hot or cold water, and which preferably is not affected by hot or cold oils or fats. The various resins and gums employed for forming varnishes constitute excellent media for this purpose. Cheaper materials such as ordinary hardened or similarly modified rosin or colophony may be used when extreme resistance to oils and fats is not essential. This plastic mass forming the primary ingredient of the sealing material will be hereinafter referred to as a resin and as noted may be any non-fluid organic material of the nature of natural or synthetic resins or gums.

This primary material may be extended or plasticized by a suitable plasticizing agent. The choice of plasticizing agents is dependent upon the resin employed and the particular purpose for which the sealing material is to be used. The selection of resin and plasticizer is such that the resulting resins when so extended shall be soluble in a suitable peptizing medium. Ethyl abietate has proved a satisfactory material to be used in conjunction with modified rosin and forms a good water-proof compound for general use. The primary material, and the plasticizer when used, are fused together to form a uniform mass which is the base of the sealing material and is peptizable.

This mass is then reduced to a substantial degree of comminution, by breaking or grinding, so that it may be easily dissolved in the peptizing medium. A suitable peptizing medium is water with ammonia therein. The particles of comminuted basic material are then suspended in the peptizing medium, with mechanical agitation if desired, through which treatment the comminuted particles of basic material are dissolved to a colloidal solution.

A filler such as talc powder, wood flour, rubber, etc., may be added while the entire mixture is being agitated or may be mechanically incorporated later. The amount of filler used should be sufficient to give the desired body to the film of sealing material when applied to and dried in the channel on the can end.

An agent to reduce the surface tension of the mass may be used so that the film of sealing material will apply more evenly to the metal of the can end. Soluble soaps are suitable for this purpose.

This material thus formed comprises a suspension of finely divided particles of filler suspended in a colloidal solution of the basic resin and plasticizer. This colloidal solution is the result of the action of a peptizer in a suitable solvent on the peptizable base comprising the resin and the plasticizer if used. The peptizer may be a volatile material so that the colloidal solution on drying will be in an irreversible state unless again peptized.

The mixture is then applied to the channel of the can end. Upon standing, or possibly by heating, the continuous phase or dispersing medium of the colloidal solution is removed, together with any such volatile peptizing material as may be present, thus forming a thin coherent film from the deposited basic resins, plasticizers and fillers to constitute the sealing medium.

The following is an example of the ingredients and proportions of the parts thereof which have been successfully used in the forming of the improved sealing material. Rosin or colophony is heated to a suitable temperature well above the melting point and a suitable hardening ingredient is introduced, such as 1 to 2 percent by weight of calcium hydroxide. The heating is continued until the hardening ingredient dissolves. The product is a hardened resin.

|  | Parts |
| --- | --- |
| Hardened rosin | 50 |
| Ethyl abietate | 20 |
| Water | 240 |
| Ammonia solution (28% by wt.) | 5 |
| Talc | 80 |
| Wood flour | 60 |
| Sodium oleate | 1 |

The hardened rosin and ethyl abietate are fused together by heating, and when the mass becomes uniform in consistency, it is cooled and comminuted. The comminuted aggregate is introduced into water to which the ammonia has been added. To the dispersion thus produced is added the talc and wood flour and the whole is then thoroughly mixed. The sodium oleate is incorporated into the mixture and the compound is completed and ready for use.

In this example, the hardened rosin is peptizable while the ethyl abietate employed as plasticizer is not. The base formed of the intimate mixture of the two is peptizable. By employing similar quantities of glycerol resinate or the ester gum of commerce, as the resinous material (which is non-peptizable) and oleic acid as a peptizable plasticizer, a peptizable base may also be formed.

Likewise it has been found that a non-volatile peptizer such as caustic soda or sodium carbonate may be employed, in lieu of the ammonia, with the hardened rosin and ethyl abietate if the film therefrom when dried need not be completely waterproof.

The relative quantities of resinous material, plasticizer and peptizer may be varied within wide limits according to the materials selected and the chemical and physical characteristics desired in the sealing film.

While a specific formula for the formation of the improved sealing material has been given, it is understood that the invention is not limited to the ingredients specifically stated, or the portion of parts given. The peptizable base is a resinous material or a combination including a resinous material, which can be brought into a colloidal solution through the use of suitable peptizing agents. The peptizing agent in turn is a liquid or liquid mixture which will dissolve the peptizable base to form a colloidal solution. By employing a volatile peptizer, the deposited film is insolubilized, since the solvent liquid alone will not bring about a colloidal dissolution. The essential features are a peptizable base consisting of a resinous material, and a volatile carrying agent having a peptizer therein: to which are preferably added a filler and a surface tension reducing agent. A further preferred addition is that of a plasticizer for the resinous material. It is preferred to accomplish the solution through the action of the peptizing agent rather than through mechanical means, as a more finely dispersed colloidal solution is obtained, as distinguished from an emulsion or suspension produced by mechanical means in the presence of protective colloids and a dispersing medium, particularly where unpeptizable bases are involved. The character of the dried film is thus more compact, homogeneous and uniform. From the above it will be apparent that a sealing material has been produced which can be made from materials that are relatively cheap and available in large quantities, the ingredients of which can be readily incorporated at a low cost of manufacture, and the resulting product is an efficient sealing material for metal containers, which sealing material is insoluble in hot and cold water and which may be made practically insoluble in hot fats and oils, or a variety of solvents.

It is obvious that other materials than those specified may be employed and the method of compounding the same varied without departing from the scope of the invention as set forth in the appended claims.

It is also obvious that the sealing material may be used for other purposes than for hermetically sealing containers.

Having thus described the invention, what is claimed as new and desired to be secured by Letters Patent, is:—

1. A sealing material comprising colloidally fine particles of a uniform mixture of hardened rosin and ethyl abietate, particles of a filler, and a volatile liquid containing said particles in suspension therein and including a peptizer.

2. A sealing material comprising colloidally fine particles of a uniform mixture of hardened rosin and ethyl abietate, particles of filler, a volatile dispersing medium containing the said particles in suspension therein and including a peptizer, and an oleate dissolved in said medium.

FREDERIC A. MADENWALD.
NORMAN J. BENO.